United States Patent [19]
Topf, Jr.

[11] Patent Number: 5,536,457
[45] Date of Patent: Jul. 16, 1996

[54] JOINT SEALING METHOD

[75] Inventor: Henry E. Topf, Jr., Roachdale, Ind.

[73] Assignee: Miller Pipeline Corporation, Indianapolis, Ind.

[21] Appl. No.: 427,108

[22] Filed: Apr. 21, 1995

Related U.S. Application Data

[60] Division of Ser. No. 74,090, Jun. 8, 1993, Pat. No. 5,431,553, which is a continuation-in-part of Ser. No. 766,628, Sep. 26, 1991, abandoned.

[51] Int. Cl.⁶ .............................. B32B 35/00; E04B 1/16
[52] U.S. Cl. .................. 264/32; 264/35; 264/36
[58] Field of Search ...................... 249/57, 83, 10, 249/11, 188, 178, 207; 425/11, 12, 59; 52/20; 404/25, 26, 73; 405/38, 39, 40, 41, 42, 55; 264/32, 35, 36, 262

[56] References Cited

U.S. PATENT DOCUMENTS

| | | |
|---|---|---|
| 2,930,295 | 3/1960 | Hale . |
| 3,248,195 | 4/1966 | Smith et al. . |
| 3,570,802 | 3/1971 | Miller . |
| 3,621,623 | 11/1971 | Downes . |
| 3,920,347 | 11/1975 | Sauriol et al. . |
| 4,132,516 | 1/1979 | Story . |
| 4,187,647 | 2/1980 | Hall . |
| 4,188,151 | 2/1980 | Hall . |
| 4,370,113 | 1/1983 | Nakashin . |
| 4,469,467 | 9/1984 | Oodill et al. . |
| 4,540,310 | 9/1985 | Ditcher et al. . |
| 4,557,625 | 12/1985 | Jahnke et al. . |
| 4,582,449 | 4/1986 | Vosswinkel . |
| 4,759,656 | 7/1988 | Wilson . |
| 4,772,154 | 9/1988 | Caroulle . |
| 4,800,054 | 1/1989 | Roestenberg . |
| 4,861,248 | 8/1989 | Ben . |
| 4,861,401 | 8/1989 | Miura et al. . |
| 4,927,163 | 5/1990 | Gagas . |
| 4,957,389 | 9/1990 | Neathery . |
| 4,986,862 | 1/1991 | Mutsufuru . |
| 5,017,313 | 5/1991 | Trimble . |
| 5,063,006 | 11/1991 | Tahara . |
| 5,201,600 | 4/1993 | Topf, Jr. et al. . |
| 5,322,653 | 6/1994 | Müller ........................ 264/36 |
| 5,328,648 | 7/1994 | McBrien et al. ............ 264/35 |
| 5,413,385 | 5/1995 | Hilbush, III ................. 264/32 |
| 5,489,405 | 2/1996 | Holbert et al. .............. 264/35 |

Primary Examiner—Karen Aftergut
Attorney, Agent, or Firm—Barnes & Thornburg

[57] ABSTRACT

A method for installing a mold apparatus in a manhole assembly and filling the mold apparatus with a sealing material to establish a solid bond that blocks inflow of fluids at the joint between abutting components of the manhole assembly includes providing an open ring, a retaining band for urging the open ring into contact with the manhole so that the open ring defines an annular channel at the joint, and a sealing material dispenser for conveying sealing material into the annular channel. The sealing material hardens in the annular channel to provide the solid bond at the joint between the two manhole components. The manhole components may be an abutting manhole frame and manhole, or two abutting sections of manhole.

19 Claims, 2 Drawing Sheets

JOINT SEALING METHOD

This is a division of application Ser. No. 08/074,090, filed Jun. 8, 1993, now U.S. Pat. No. 5,431,553 which is a continuation-in-part of application Ser. No. 07/766,628, filed Sep. 26, 1991, now abandoned.

BACKGROUND AND SUMMARY OF THE INVENTION

This invention relates to manhole sealing systems and, in particular, to an apparatus and method for molding a sealing material to establish a fluid-tight seal and bond either between a manhole and a manhole frame supported on the manhole or between two sections of a manhole. More particularly, this invention relates to an apparatus and method for providing a mold that can be filled with sealing material to establish a seal to block unwanted inflow of groundwater through a space between the manhole and manhole frame or between two sections of a manhole.

A manhole is a large diameter vertical pipe often made of brick or a series of precast concrete sections that extends downward from a point just below street level to a buried sewer pipe included in a municipal sewerage system. Typically, a heavy cast iron manhole frame is placed on the circular top edge of the manhole to hold a manhole cover above the top end of the manhole at street level. While the manhole cover is visible to someone standing on the street, the manhole frame supporting the cover usually is hidden from view.

In some cases, the street or sidewalk pavement around the manhole frame acts to hold the manhole frame in place on the manhole. It is also known to use bolts or other hardware to anchor the manhole frame to the underlying manhole. The familiar manhole cover rests on a circular ledge provided near the top end of the manhole frame to lie at street level. Removal of the manhole cover from the frame exposes a vertical access aperture that extends downwardly through the hollow manhole frame to enable service workers to pass through the manhole frame to reach the downwardly extending manway passage provided inside the manhole.

Most municipalities are provided with two types of sewerage systems. The first type is a sewage disposal sewer system, which is designed to carry off refuse fluids and waste products to a sewage treatment plant. The second type, often referred to as a "storm sewer" system, is connected to street drains and the like to carry off surface water. A serious problem arises when rainwater or groundwater leaks into a manhole connected to the sewage disposal sewer system. The typical sewage treatment plant provided to process sewage conducted through a sewage disposal system is designed to handle sewage only and is not designed to have enough capacity to handle large volumes of surface water that leak into the sewage disposal sewers through leaky manholes.

A small gap between the top face of the manhole and the bottom face of the manhole frame (or at the joint between two abutting manhole sections) can provide just enough space for significant amounts of rainwater, groundwater, or other liquids to leak from the surrounding ground into the manhole and the sewage disposal sewer pipes connected to the manhole. The capacity of a sewerage system having a sizable number of leaky manhole frames can be overloaded quite easily during prolonged and heavy rainstorms.

A gap between a manhole frame and an underlying manhole large enough to permit surface water to leak into a manhole can develop in several different ways. Manhole frames tend to vibrate due to loads applied by traffic moving on the street and over the manhole cover and, over time, such vibration can cause even heavy manhole frames to move off the underlying manhole to form a gap therebetween. Such movement can occur even though the manhole frame is initially anchored in some way to the manhole. Thermal contraction or expansion of manhole components might also cause the components to shift relative to one another, creating a gap. Likewise, ground movement resulting from freezing and thawing or earth consolidation may create a gap. Also, any seal established between the manhole and manhole frame can deteriorate or fail over time and cause a leakage gap to develop.

A leakage gap can also develop at the joint between two abutting manhole cylinders. Manholes are typically formed by connecting precast concrete cylinders together in series to establish a long manhole unit. Water inflow problems can arise if any gaps develop at the joint between a pair of adjoining cylinders. Here again, poor anchoring and sealing connection problems may cause gaps to develop. It is also common for leaks to develop because one manhole cylinder has moved relative to an adjoining manhole cylinder or because a seal provided between the two cylinders has failed.

Attempts have been made to provide various types of devices to prevent manhole leakage problems. For example, U.S. Pat. No. 4,557,625 to Jahnke et al. Another manhole sealing device is described in U.S. Pat. No. 4,582,449 to Vosswinkel.

An apparatus and method for molding a sealing material to establish a fluid-tight sealing bond closing any gap between an inground manhole and a manhole frame without removing the manhole frame from its mounted position on the manhole would simplify rehabilitation of leaky manholes. An apparatus and method that could also be used to fill and close any gap at the joint between abutting manhole cylinder portions would also provide many benefits to manhole installation and rehabilitation work crews. Also, an apparatus and method that could be applied to solve fluid inflow problems affecting a great number of manholes in a sewerage network quickly, simply, and at low cost would be welcomed by many managers of city and metropolitan sewerage systems.

According to the present invention, a mold apparatus is provided for use in a manhole assembly to seal a joint between two abutting manhole components. The mold apparatus includes an open ring, a retaining band coupling the ring to one of the manhole components so that the ring forms a ring-shaped channel at the joint, and a sealant dispenser for conveying sealing material into the channel. The sealing material hardens in the ring-shaped channel and forms a bond at the joint between the two abutting manhole components.

The open ring includes an upper annular portion, a lower annular portion spaced apart radially outwardly from the upper annular portion, and an intermediate portion extending radially between the upper annular portion and the lower annular portion. The retaining band engages the lower annular portion to urge the lower annular portion into engagement with the second manhole component and to place the upper annular portion in spaced-apart confronting relationship with the joint. When the retaining band positions the open ring in the manhole in this manner, the intermediate portion and the upper annular portion of the open ring cooperate to define an annular channel at the joint.

In preferred embodiments, the lower annular portion includes a radially outwardly directed face and a radially inwardly directed face. A strip of adhesive is positioned on the radially outwardly directed face for contact with the interior wall of one of the manhole components.

If the first manhole component is a manhole frame, and the second manhole component is a manhole, the mold apparatus is positioned to straddle the joint between the manhole frame and the manhole to prevent unwanted inflow of fluids in any gaps which may have formed at the joint. A radially outwardly directed face of the lower annular portion of the open ring is positioned to engage the cylindrical interior side wall of the manhole. This brings the upper annular portion and the intermediate portion into proper position to establish the ring-shaped channel at the joint.

Alternatively, if the first manhole component is a first manhole section and the second manhole component is a second manhole section abutting the first manhole section, the mold apparatus is positioned to straddle the joint between the first and second manhole sections to prevent leakage at that joint. A radially outwardly directed face of the bottom annular portion of the open ring is positioned to engage the cylindrical interior wall of the second manhole section. This brings the upper annular portion and the intermediate portion into position to establish the ring-shaped channel at the joint.

The present invention also provides a method of providing a sealed bond at a joint between two abutting manhole components. The method includes the steps of positioning a mold apparatus in proximity to the joint, coupling the mold apparatus to one of the manhole components to form a ring-shaped channel at the joint, filling the ring-shaped channel with a sealing material, and curing the sealing material to create the sealed bond at the joint to block leakage of fluids between the two manhole components.

The present invention further provides a kit having component parts for use in sealing a joint between two abutting manhole components. The kit includes the combination of a plurality of open rings of differing diameters, a plurality of open annular retaining bands sized to engage the plurality of open rings, and a supply of sealing material. The kit may also include a mixing paddle for mixing the components of the sealing material to form a sealant mixture and a supply of primer suitable for application to the open rings to prepare surfaces of the open rings for contact with the sealing material.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE DRAWINGS

Figure 1:
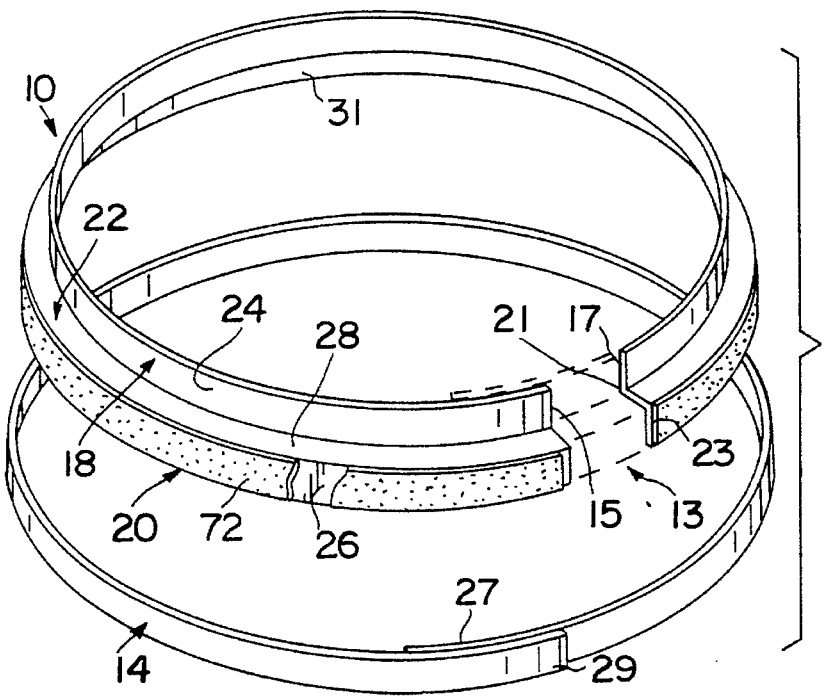
FIG. 1 is a perspective view of an open ring and retaining band particularly adapted for use as a manhole sealing apparatus.

A mold apparatus 10 for use in a manhole assembly to seal a joint and establish a bond between two abutting manhole components is shown in FIG. 1. Mold apparatus 10 can be used to seal a joint and establish a bond between two adjacent and abutting cylindrical manhole sections, or between a manhole frame and abutting manhole.

Mold apparatus 10 includes an open ring 12 and an open annular spring retaining band 14. Retaining band 14 expands outwardly to hold ring 12 in place in a manhole as shown, for example, in FIG. 3. Ring 12 cooperates with the manhole to define an annular channel 16 that can be filled with a sealing and bonding material to seal a joint and establish a bond where leakage is occurring.

Figure 3:
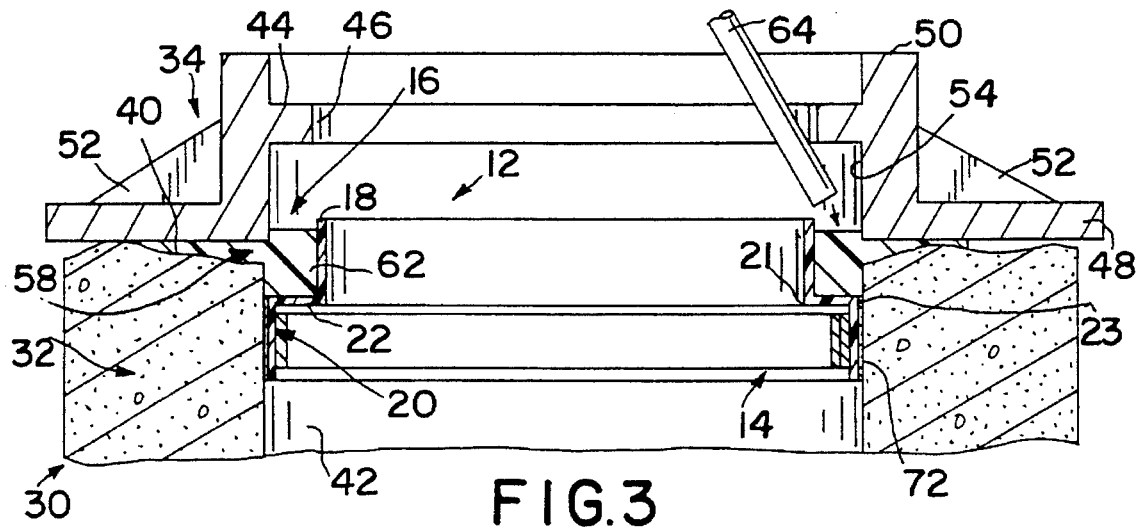
FIG. 3 is a sectional view of the apparatus of the present invention in place to seal a manhole.

Ring 12 is an open, annular ring preferably constructed of flexible plastic. Although the thickness and material of construction of ring 12 may vary, it is important that ring 12 have at least some resiliency to allow ring 12 to be easily manipulated. Ring 12 is defined by a strip of material having first end 15 and second end 17. A split 13 is located between the first end 15 and the second end 17 and provided to make ring 12 easier to manipulate. When arranged in place in a manhole 32 as shown in FIG. 3, ring 12 is compressed such that ends 15 and 17 abut.

Between the first end 15 and second end 17, ring 12 includes an upper portion 18, a lower portion 20, and an intermediate portion 22 extending between upper portion 18 and lower portion 20. Lower portion 20 is concentric with upper portion 18 and is spaced apart radially outwardly from upper portion 18. Although upper portion 18 and lower portion 20 are shown as similar in length axially for purposes of illustration, upper portion 18 and lower portion 20 may be of different dimensions. Indeed, it may be desirable to make lower portion 20 axially long enough to receive retaining band 14, while making upper portion 18 much longer axially to create a deeper annular channel than is illustrated. Likewise, the radial dimension of intermediate portion 22 may be varied in accordance with the particular application desired.

Upper portion 18 includes a radially-outwardly directed, vertically extending face 24. When arranged in place in a manhole with ends 15, 17 touching, upper portion 18 has a smaller diameter than the diameter of the manhole (as shown in FIG. 3) such that when ring 12 is arranged in place in manhole 32, face 24 lies in confronting, spaced-apart relationship with an interior wall 42 of manhole 32. Upper portion 18 also includes a bottom edge 21 at which intermediate portion 22 is attached.

Lower portion 20 also includes a radially-outwardly directed, vertically extending face 26. When arranged in place in manhole 32 with ends 15, 17 touching, lower portion 20 has a diameter substantially equal to the internal diameter of manhole 32. Thus, as shown, for example, in FIG. 3, when ring 12 is arranged in a manhole, face 26 engages manhole 32. Lower portion 20 also includes a top edge 23 at which intermediate portion 22 is attached.

Intermediate portion 22 extends radially between the bottom edge 21 of upper portion 18 and the top edge 23 of lower portion 20. Intermediate portion 22 includes an axially upwardly facing, radially extending face 28 upon which sealing material rests when mold apparatus 10 is in use as shown, for example, in FIG. 3.

Retaining band 14 is typically a resilient metal spring preferably having overlapping ends 27, 29. Ends 27, 29 slide relative to one another when retaining band 14 is compressed or expanded radially. When properly positioned in manhole 32, retaining band 14 expands to engage a face 31 of lower portion 20 to hold lower portion 20 in tight-fitting engagement with cylindrical interior wall 42 of manhole 32. Face 31 is the radially-inwardly facing, vertically extending face opposite face 26. A strip of self-adhesive foam 72 may be inserted between lower portion 20 and the manhole to further assist in sealing lower portion 20 in place against wall 42 as shown in FIGS. 1 and 3.

Figure 5:
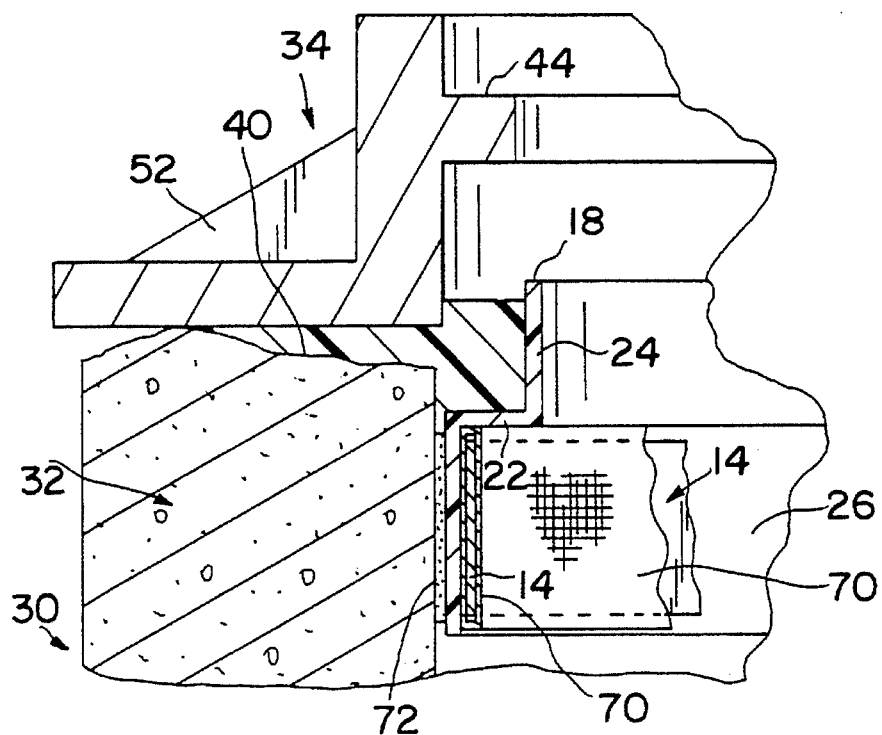
FIG. 5 is an enlarged partial sectional view of an alternative embodiment of the apparatus of the present invention having a pocket on the ring for holding the retaining band.

Retaining band 14 may be entirely separated from ring 12 when apparatus 10 is not in use. Alternatively, a pocket or the like provided by a sleeve 70 may be provided on face 31 of lower portion 20 to receive retaining band 14 as shown in FIG. 5. A similar sleeve is illustrated in my co-pending U.S. patent application Ser. No. 07/766,628, relevant portions of which are hereby incorporated by reference.

Figure 2:
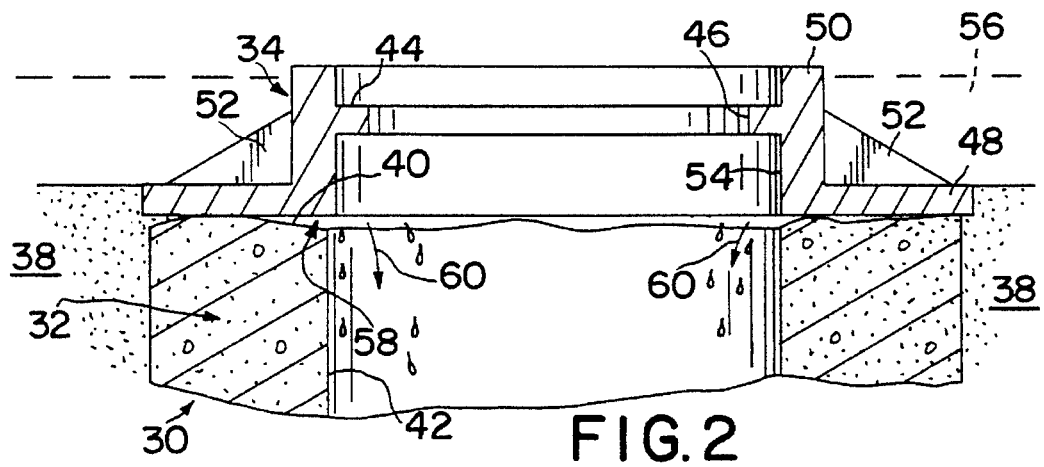
FIG. 2 is a sectional view of a manhole frame and manhole showing leakage.

A typical manhole assembly is illustrated in FIG. 2. Manhole assembly 30 includes a manhole 32, a manhole frame 34, and a manhole cover 36 (shown, for example, in FIG. 4). Manhole 32 is typically a cylindrical structure made of brick or precast concrete. Manhole 32 is buried in the ground 38 and connected to a sewerage system (not shown) to provide a passage for permitting service persons to gain access to the underlying sewerage system. Manhole 32 includes a circular top face 40 and a cylindrical interior side wall 42.

Manhole frame 34 is typically a heavy cast iron structure which rests on top face 40 of manhole 32. Manhole frame 34 includes a circular ledge 44 for supporting manhole cover 36 in a position closing a manhole access opening 46. Manhole frame 34 further includes a ring-shaped base 48 sized to rest on top face 40, an upright cylindrical member 50, and a plurality of circumferentially spaced-apart stiffening webs 52. Upright cylindrical member 50 includes a cylindrical interior side wall 54 extending downwardly from the ledge 44 toward the underlying manhole 32. Manhole frame 34 normally is substantially buried in pavement 56.

Figure 4:
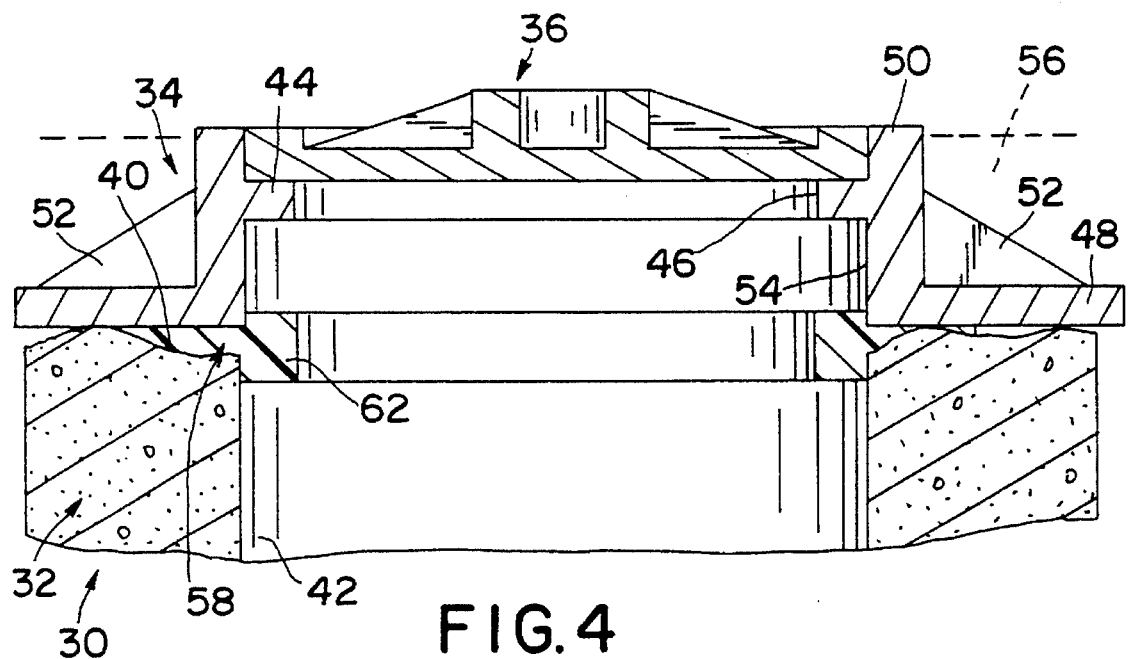
FIG. 4 is a sectional view of a sealed manhole with the apparatus of the present invention removed.

As shown in FIGS. 2–4, a space, opening, or gap 58 may develop between manhole frame 34 and top face 40. Rainwater or other fluids 60 in the ground 38 around manhole 32 may enter gaps such as gap 58 and leak into manhole 32. The actual size and geometry of such gaps, and the actual flow path of the leaking fluid, of course may vary, but often occurs as shown. Similar gaps also may form between abutting cylindrical sections of manhole 32, also causing leakage. Such abutting sections are illustrated in my copending U.S. patent application Ser. No. 07/766,628.

As shown in FIG. 3, intermediate portion 22 and upper portion 18 cooperate to define annular channel 16. Specifically, face 24 of upper portion 18 and face 28 of intermediate portion 22 cooperate to define channel 16 at the joint between manhole frame 34 and manhole 32, or between abutting cylindrical sections of manhole.

Sealing material 62 is placed in annular channel 16 to form a bond spanning gap 58 to prevent unwanted leakage. Suitable sealing materials include ENCAPSEAL Safe-T-Seal polyurethane, available from Miller Pipeline Corporation; fiberglass compositions such as those available from E.I. dupont deNemours & Co.; and a variety of well-known epoxies and polyurethanes. Sealing materials such as these are liquids which cure at ambient temperatures after a predetermined amount of time. In the case of ENCAPSEAL Safe-T-Seal, the polyurethane prepolymer is sold as ENCAPSEAL "Part A," while the other polymerization reactants are sold in a separate container as ENCAPSEAL "Part B." In use, "Part A" and "Part B" are mixed to initiate the polymerization reaction. The resulting sealant mixture is placed in a sealant dispensing tube 64 or the like. Tube 64 is used to pour the sealant mixture into annular channel 16, from which the sealant mixture may enter gap 58.

A method of using apparatus 10 to establish a sealed bond between manhole 32 and manhole frame 34 comprises first the step of inserting ring 12 and retaining band 14 through manhole access opening 46 and positioning ring 12 and retaining band 14 in proximity to a gap 58 to be sealed. It will be necessary to compress retaining band 14 slightly to fit it through access opening 46.

Next, retaining band 14 is allowed to expand to engage face 31 and thereby force lower portion 20 into engagement with cylindrical interior side wall 42 of manhole 32. If adhesive foam 72 is provided on face 26, the adhesive foam 72 assists in sealing lower portion 20 against interior wall 42.

A primer such as ENCAPSEAL Safe-T-Seal primer sold by Miller Pipeline is brushed onto face 24 of upper portion 18 and face 28 of intermediate portion 22. The primer assists in ensuring that the sealant mixture 62 adheres to ring 12.

Next, dispensing tube 64 is used to pour sealant mixture 62 into annular channel 16. Because the components of sealant mixture 62 (e.g., "Part A" and "Part B") have already been combined, the dispensing step must be handled efficiently to prevent polymerization from beginning inside dispensing tube 64. Annular channel 16 is filled sufficiently so that sealant mixture 62 spans gap 58. Sealant mixture 62 may also migrate into gap 58. Once sealant mixture 62 has been poured into place, it is left undisturbed for a short time so that the polymerization reaction will proceed and sealant mixture 62 will cure.

When sealant mixture 62 has hardened, the operator may optionally remove apparatus 10 from manhole 32 for use at another job site (see FIG. 4). Alternatively, because apparatus 10 is relatively inexpensive, it may be cost effective to simply leave apparatus 10 in place to provide a pressure seal in addition to the bonded seal provided by sealing material 62.

The present invention also provides a kit having component parts capable of being assembled in the field for use in providing a solid bond at a joint between a pair of abutting manhole components. The kit includes a plurality of open rings such as open ring 12, the open rings having differing diameters for use in a variety of manhole assemblies. The kit further includes a plurality of retaining bands such as retaining band 14.

The kit also includes a supply of sealing material for use in connection with open ring 12 and retaining band 14 as previously described. The sealing material supply may include, for example, ENCAPSEAL Safe-T-Seal Part A and Part B as sold by Miller Pipeline Corp. The kit also includes a mixing paddle of a variety well known to those of ordinary skill in the art for mixing the components of the sealant mixture. Further, the kit includes a supply of primer for application to faces 24 and 28 of open ring 12 to prepare those surfaces for contact with sealant mixture 62. The kit may optionally include a sealing material dispenser 64.

Although the invention has been described in detail with reference to certain preferred embodiments, variations and modifications exist within the scope and spirit of the invention as described and defined in the following claims.

I claim:

1. A method for providing a sealed bond at a joint between a manhole and a manhole frame mounted on top of the manhole, the manhole including an interior cylindrical side wall, the manhole frame being formed to include an access opening, the method comprising the steps of inserting a mold apparatus through the access opening, the mold apparatus including an upper open annular portion, a lower open annular portion spaced apart radially outwardly from the upper open annular portion, and an intermediate portion extending radially between the upper open annular portion and the lower open annular portion, coupling the lower open annular portion of the mold apparatus to the interior cylindrical side wall of the manhole to position the upper open annular portion in confronting, spaced-apart relationship with the interior cylindrical side wall to create an annular channel between the interior cylindrical side wall and the upper open annular portion of the mold apparatus, filling the annular channel with a sealing material, and curing the sealing material to create the sealed bond at the joint to block leakage of fluids between the manhole and the manhole frame at the joint.

2. The method of claim 1, wherein the inserting step includes the step of compressing the mold apparatus so that free ends of the upper open annular portion overlap and free ends of the lower open annular portion overlap.

3. The method of claim 1, wherein the mold apparatus includes an open annular retaining band engaging the lower open annular portion, the open annular retaining band having a pair of free ends, and the inserting step includes the steps of compressing the open annular retaining band so that its free ends overlap and then passing the open annular retaining band through the access opening.

4. The method of claim 1, wherein the mold apparatus includes an open annular retaining band engaging the lower open annular portion, and the coupling step includes the step of expanding the open annular retaining band so that the open annular retaining band provides a spring force urging the lower open annular portion into tight-fitting engagement with the interior cylindrical side wall of the manhole.

5. The method of claim 1, further comprising the step of removing the mold apparatus after the filling and curing steps to leave the sealed bond at the joint.

6. A method for providing a sealed bond at a joint between a first manhole section and a second manhole section abutting the first manhole section, the first manhole section including a first cylindrical interior side wall, the second manhole section including a second cylindrical interior side wall, the method comprising the steps of positioning a mold apparatus in proximity to the joint, the mold apparatus including an upper open annular portion, a lower open annular portion spaced apart radially outwardly from the upper open annular portion, and an intermediate portion extending radially between the upper open annular portion and the lower open annular portion, coupling the lower open annular portion of the mold apparatus to the second cylindrical interior side wall to position the upper open annular portion in confronting, spaced-apart relationship with the first cylindrical interior side wall to create an annular channel between the first cylindrical interior side wall and the upper open annular portion of the mold apparatus, filling the annular channel with a sealing material, and curing the sealing material to create the sealed bond at the joint to block leakage of fluids between the first manhole section and the second manhole section at the joint.

7. The method of claim 6, wherein the positioning step includes the step of compressing the mold apparatus so that free ends of the upper open annular portion overlap and free ends of the lower open annular portion overlap.

8. The method of claim 6, wherein the mold apparatus includes an open annular retaining band engaging the lower open annular portion, the open annular retaining band having a pair of free ends, and the positioning step includes the step of compressing the open annular retaining band so that its free ends overlap.

9. The method of claim 6, wherein the mold apparatus includes an open annular retaining band engaging the lower open annular portion, and the coupling step includes the step of expanding the open annular retaining band so that the open annular retaining band provides a spring force urging the lower open annular portion into tight-fitting engagement with the second cylindrical interior side wall.

10. The method of claim 6, further comprising the step of removing the mold apparatus after the filling and curing steps to leave the sealed bond at the joint.

11. The method of claim 3, wherein the coupling step includes the steps of contacting the mold apparatus to the interior cylindrical side wall and allowing the open annular retaining band to expand so that it holds the mold apparatus against the interior cylindrical side wall to create the annular channel between the mold apparatus and the interior cylindrical side wall.

12. The method of claim 11, wherein the coupling step further includes the step of arranging the mold apparatus to cause the intermediate portion to define a floor of the annular channel so that sealing material is deposited onto the intermediate portion during the filling step.

13. A method for sealing a joint between first and second manhole components, the method comprising the steps of passing a ring into an opening formed in the first manhole component, the ring including an upper annular portion, a lower annular portion spaced apart radially outwardly from the upper annular portion, and an intermediate portion extending radially between the upper annular portion and the lower annular portion, holding the lower annular portion in engagement with the second manhole component to place the upper annular portion in spaced-apart confronting relationship with the joint so that the intermediate portion, the upper annular portion, and the first and second manhole components cooperate to define an annular channel at the joint, and placing a sealing material in the annular channel and curing the sealing material so that the sealing material establishes a solid bond between the first and second manhole components at the joint to block leakage of fluids between the first and second manhole components at the joint.

14. The method of claim 13, wherein the passing step includes the steps of providing a strip having a first end and a second end and arranging the strip so that the first end abuts the second end to define a split between the first end and the second end such that the ring is formed having the upper annular portion, the lower annular portion, and the intermediate portion each extending between the first and second end, and then positioning the ring with the split adjacent to the joint.

15. The method of claim 13, wherein the holding step includes the steps of providing a spring, passing the spring into the opening formed in the first manhole component, positioning the spring adjacent to the lower annular portion, and allowing the spring to urge the lower annular portion into engagement with the second manhole component.

16. The method of claim 15, wherein the lower annular portion includes a pocket and the positioning step includes the step of placing the spring in the pocket of the lower annular portion.

17. The method of claim 13, wherein the holding step includes the step of providing a strip of self-adhesive foam and attaching the lower annular portion to the second manhole component using the strip of self-adhesive foam.

18. The method of claim 17, wherein the lower annular portion includes a radially outwardly directed face and a radially inwardly directed face and the attaching step includes the steps of first attaching the strip of self-adhesive foam to the radially outwardly directed face of the lower annular portion and then contacting an exposed adhesive portion of the strip of self-adhesive foam to the second manhole component.

19. The method of claim 18, wherein the holding step further includes the steps of providing a spring, passing the spring into the opening formed in the first manhole component, positioning the spring adjacent to the radially inwardly directed face of the lower annular portion, and allowing the spring to urge the exposed adhesive portion of the strip of self-adhesive foam into engagement with the second manhole component.

* * * * *